United States Patent [19]
Hobson et al.

[11] Patent Number: 5,744,241
[45] Date of Patent: Apr. 28, 1998

[54] FLUOROPOLYMER COATED ELASTOMERIC ROLLERS AND STRUCTURES

[75] Inventors: Alex Ray Hobson, Elkton, Md.; Robert L. Sassa, Newark, Del.; Steven H. Speck, North East, Md.; Tit-Keung Lau, Wilmington, Del.

[73] Assignee: W. L. Gore & Associates, Inc., Newark, Del.

[21] Appl. No.: 567,377

[22] Filed: Dec. 4, 1995

Related U.S. Application Data

[63] Continuation of Ser. No. 317,971, Oct. 4, 1994.

[51] Int. Cl.$^6$ ............... B32B 27/32; B29D 7/00
[52] U.S. Cl. ............... 428/422; 264/212; 264/213; 264/214; 264/216
[58] Field of Search ............... 428/422; 264/212, 264/213, 214, 216

[56] References Cited

U.S. PATENT DOCUMENTS

| | | | |
|---|---|---|---|
| 3,345,942 | 10/1967 | Meltz | 101/348 |
| 3,912,901 | 10/1975 | Strella et al. | 219/216 |
| 3,941,635 | 3/1976 | Tavelle et al. | 156/86 |
| 3,953,566 | 4/1976 | Gore | 264/288 |
| 3,962,153 | 6/1976 | Gore | 260/2.5 R |
| 4,149,797 | 4/1979 | Imperial | 355/3 FU |
| 4,219,327 | 8/1980 | Idstein | 432/60 |
| 4,257,699 | 3/1981 | Lentz | 355/3 FU |
| 4,309,591 | 1/1982 | Kanoto et al. | 219/216 |
| 4,309,803 | 1/1982 | Blaszak | 29/130 |
| 4,324,482 | 4/1982 | Szlucha | 355/3 FU |
| 4,329,565 | 5/1982 | Namiki et al. | 219/216 |
| 4,372,246 | 2/1983 | Azar et al. | 118/60 |
| 4,430,406 | 2/1984 | Newkirk et al. | 430/99 |
| 4,522,866 | 6/1985 | Nishikawa et al. | 428/216 |
| 4,562,335 | 12/1985 | Katsuno et al. | 219/216 |
| 4,789,565 | 12/1988 | Kon et al. | 427/375 |
| 4,796,046 | 1/1989 | Suzuki et al. | 355/3 FU |
| 4,887,340 | 12/1989 | Kato et al. | 29/130 |
| 5,061,965 | 10/1991 | Ferguson et al. | 355/284 |
| 5,123,151 | 6/1992 | Uehara et al. | 29/130 |
| 5,150,161 | 9/1992 | Bujese | 355/256 |
| 5,180,899 | 1/1993 | Inasaki | 219/469 |
| 5,237,049 | 8/1993 | Cavanaugh et al. | 528/491 |

FOREIGN PATENT DOCUMENTS

| | | |
|---|---|---|
| 121010 | 2/1946 | Australia . |
| 0 156 046 | 10/1985 | European Pat. Off. . |
| 0 165 719 | 12/1985 | European Pat. Off. . |
| 0 441 114 A1 | 8/1991 | European Pat. Off. . |
| 0 625 735 A1 | 11/1994 | European Pat. Off. . |
| 4-361026 | 12/1992 | Japan . |
| 5-134574 | 5/1993 | Japan . |
| 5-147163 | 6/1993 | Japan . |
| 91/07278 | 5/1991 | WIPO . |
| 91/18069 | 11/1991 | WIPO . |
| 93/05100 | 3/1993 | WIPO . |

OTHER PUBLICATIONS

International Search Report for PCT/US94/13813.

*Primary Examiner*—Kriellion S. Morgan
*Attorney, Agent, or Firm*—Carol A. Lewis White

[57] ABSTRACT

The present invention is an improved release coating for use on a variety of surfaces, such as printer rollers and belts. The coating of the present invention is an thin expanded polytetrafluoroethylene skin that has a porous surface attached to a substratum and an impermeable surface exposed as the contact surface. This use of dual surfaces on a single thin coating provides both an excellent bond to substratum materials, such as a silicone elastomer layer, as well as being highly wear resistant and resistant to chemical attack.

13 Claims, 2 Drawing Sheets

FLUOROPOLYMER COATED ELASTOMERIC ROLLERS AND STRUCTURES

RELATED APPLICATIONS

This application is a continuation application of co-pending U.S. Pat. application Ser. No. 08/317,971, filed Oct. 4, 1994.

BACKGROUND OF THE INVENTION

1. Field of the Invention

The present invention relates to release coatings used in a variety of applications where elastomeric rollers are employed, such as elastomeric rollers used in xerographic reproduction technologies (e.g., copiers, faxes, laser printers, and other printing devices) and other paper handling applications.

2. Description of Related Art

Resilient rollers are presently used for a variety of purposes. In the area of xerographic and offset printers, such rollers play an integral role in the proper operation of these devices. Generally, it has been desirable to have a roller that possesses a number of properties, including: good conformance (i.e., good grip around a three-dimensional object, such as a sheet of paper), good chemical resistance, good durability (i.e., resistance to abrasion and wear), and good thermal resistance. Prior attempts to provide a balance of these properties have not been entirely successful. The ability to effectively combine these properties is further complicated by the fact that many printing and paper handling industries are highly cost sensitive.

Traditional rollers have generally comprised a rubber-like material, such as silicone, that is thickly coated over a solid core, such as metal. For most applications, this construction works well at least initially, but tends to display a number of problems over time. First, silicone material generally has limited wear resistance, eventually resulting in worn and uneven surfaces. Second, silicone has only limited release properties, resulting in dirt and contamination problems that can ruin image quality. Wear of the silicone material tends to only worsen the release properties of this material. Third, the silicone material often will become deformed on the surface due to shear stress, leading to wrinkles, distortion, or cracking of the resilient surface and imperfections that can ruin printer performance. Finally, silicone material will swell or degrade over time, especially when it is exposed to certain solvents, oils, and vapors. This process can result in loss of resilience and conformability and may also produce distortion or cracking of the elastic surface.

A number of solutions have been proposed to try to improve some of these problems. For example, in U.S. Pat. No. 3,345,942 to Meltz fluoropolymer particles were used to fill a rubber roller coating. This approach is believed to provide some improvement in release, but chemical resistance of the roller is still limited due to the exposed rubber. Further, effective surface energy is shared between the rubber and the fluoropolymer, thus reducing release properties relative to the use of fluoropolymers alone.

Another approach has been to spray on a top coat of fluoropolymer particulate, as is disclosed in U.S. Pat. No. 4,789,565 to Kon et al. and Japanese Laid-Open Patent Application JP 4-361026 to Suzuki et al. In these instances, many thin layers of fluoropolymer are built up on the roller to prevent the coating from cracking. While this approach may present a better release coated surface, it tends to be very complex, requiring tremendous effort to prevent the rubber intermediate layer from getting damaged due to the thermal cycling required to cure or sinter the PTFE particles to form a continuous PTFE layer. Further, a number of other processing problems can result, including being prone to contamination-related defects and a significant risk of pinholes developing during processing.

Still another approach is to employ a sleeve of fluoropolymer material over the roller surface. Examples of this approach are described in U.S. Pat. Nos. 5,180,899 to Inasaki, 4,219,327 to Idstein, and 3,912,901 to Strella et al. This approach does protect the intermediate resilient layer from chemical attack and thermal degradation, but it seriously diminishes the conformability of the rollers. Since fluoropolymers are relatively hard when compared to rubbers, the final effective durometer reading of such materials will increase significantly when coated in this manner. This causes problems with conformance to products being processed, such as conformance to paper passing between a fuser roller and a sleeved pressure roller. Such lack of conformance may result in improper fusing of toner and poor durability of the print. In addition, delivery of release agents to the rollers of this construction can be uneven on the paper edges, causing poor uniformity and buildup. Another problem with fluoropolymer sleeves is that they have a great chance of de-bonding due to the shear stresses created by the compression and extension of the interface between fluoropolymer film and rubber. Other deficiencies of fluoropolymer tubes are their lack of reliable concentricity and their inability to be produced consistently below 0.002" wall thickness.

A good example of the problem of de-bonding is illustrated in U.S. Pat. No. 5,180,899 to Inasaki. This patent discloses a multiple layered roller structure having a sponge layer coated with a silicone rubber layer that is then coated with a "TEFLON" tube layer. The combination of the properties of these various layers is said to improve conformability over silicone material alone. The TEFLON (i.e., full density polytetrafluoroethylene (PTFE)) tube layer is reported to contribute better aging characteristics and is less likely to collect soil or become deformed on its surface. Despite these improvements, this structure is still believed to be limited in a number of respects. For example, bonding between the PTFE tube and the substrate may be difficult. A full density PTFE material generally will not readily adhere to other materials without etching or similar treatment. Even with such treatments, the bond between PTFE and other materials tends to be somewhat tenuous. This can result in shifting of the tube layer and wrinkles and other problems. Further, full density PTFE has generally poor tensile strength and creep characteristics, again leading to shifting and its resulting distorted surface problems. Finally, generally constructions requiring many layers of material, particularly those employing one or more tubes of materials, are difficult to assemble and may be more prone to separation or distortion during use. The use of an extra intermediate sponge layer is stated to reduce stresses between the layers during use. Unfortunately, this approach is believed to be less than a fully satisfactory solution, with conformance characteristics still limited and the complexity of manufacture significantly increased.

Fluoropolymer elastomer rubber coatings are yet another technology path used to attempt to solve the above mentioned problems. Examples of these are disclosed in U.S. Pat. Nos. 5,061,965 to Ferguson et al. and U.S. Pat. No. 4,430,406 to Newkirk et al. Again the problem of complexity in manufacture and poor release of aggressive chemicals has prevented this technology from meeting all the needs required by printer manufacturers. U.S. Pat. No. 5,061,965 attempts to address some of these concerns by applying still an additional top coat over the fluoroelastomer of silicone to prevent buildup of contamination. Again, this increases the complexity of this device and is believed to further limit conformability.

Still another approach has been to provide expanded polytetrafluoroethylene (ePTFE) reinforcement of the silicone material. Examples of this approach are disclosed in U.S. Pat. No. 5,123,151 to Uehara et al., U.S. Pat. No. 4,887,340 to Kato et al. and U.S. Pat. No. 3,345,942, and Japanese Laid-Open Patent Application 5-134574 assigned to Sumitomo Electric Industries, Ltd. All of these references teach that ePTFE membranes can help in extending the durability of the rubber. They are all deficient in that they attempt to solve the problems with silicone material by embedding ePTFE material, leaving an exposed layer of silicone or silicone/PTFE on the surface of the roller. For example, Japanese Laid-Open Patent Application No. 5-134574 to Sumitomo discloses a fixing roller for use in a printer that comprises an exposed elastic layer reinforced with a substrate of a fluororesin material (e.g., tetrafluoroethylene resin). The fluororesin material is provided with a roughened surface to improve bonding between the elastic layer and the underlying reinforcement layer. This patent application reports that this construction prevents shifting of the resilient layer and reduces the risk of cracking or similar problems. As a result, the patent claims longer life and better durability.

Despite the improvements of this approach, reinforced silicone is not believed to be fully satisfactory as a roller surface. Since silicone polymer remains as the release surface, this structure continues to be limited by some of the same wear and release deficiencies of conventional silicone material. Among these problems are toner build-up, poorer paper release, susceptibility to damage from stripper fingers and the like, and image problems. Further, an exposed silicone material continues to be susceptible to swelling and damage from exposure to various contaminates.

Another proposed approach has been plasma/monomer treatment of PTFE, as is described in Japanese Laid-Open Patent Application 5-147163 to Ayano, et al. This approach attempts to address the issue of poor bond of solid fluoropolymers to rubber. Unfortunately, this process is very complex and requires the use of monomers, reactors which require vacuum, and special plasmas for the polymerization to occur. Although the bonding issues are improved significantly the complexity is greatly increased. Further, the basic problem of conformance is not addressed here and this will still be a problem in printing or other applications.

It is the intent of this invention to solve all of the above mentioned problems of good conformance, excellent thermal resistance, excellent durability, excellent resistance to chemicals, excellent resistance to the buildup of contamination, and simplicity and cost effectiveness of manufacturing.

Accordingly, it is a primary purpose of the present invention to provide an improved resilient surface that has both good release and good wear properties.

It is another purpose of the present invention to provide an improved release surface that is protected from contamination and degradation to provide long-term resilient properties.

It is still another purpose of the present invention to provide an improved release surface of PTFE that is firmly attached to substrate material, with vastly diminished risk of separation or surface distortion.

These and other purposes of the present invention will become evident from review of the following specification.

SUMMARY OF THE INVENTION

The present invention is an improved release coating for use on a variety of contact surfaces, and particularly for roller and belt surfaces, such as those found in various printer technologies. The release coating of the present invention comprises a thin expanded polytetrafluoroethylene (ePTFE) skin coated over a substratum, such as a silicone elastomer coating. To establish a good mechanical bond to the substratum, the skin has a porous adhered surface, with adhesive imbibed within the pores of the skin. This produces a bond that avoids many of the previous problems of delamination, wrinkles and distortions that previous coated rollers have experienced. However, in order to protect the substratum from chemical attack, the skin includes an opposing exposed surface that is rendered non-porous. As a result, the release coating of the present invention is highly resistant to wear and attack.

Preferably, the present invention achieves a non-porous exposed surface on the release coating through one of two methods. First, after attachment to a substratum, the exposed surface is subjected to elevated heat and pressure to densify the expanded PTFE into a continuous, impermeable surface. Alternatively, the exposed surface may be coated with a solution of fluoropolymer that completely fills the pores and renders the exposed surface impermeable.

The release surface of the present invention is far more compliant and resilient than most previous fluoropolymer coatings. Moreover, due to the porous nature of the adhered surface, without etching or other surface treatments, the expanded PTFE forms a very secure bond that is not prone to separation or distortion. Finally, since only fluoropolymer material is present on the exposed surface, the material of the present invention is very durable and resistant to wear and attack.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
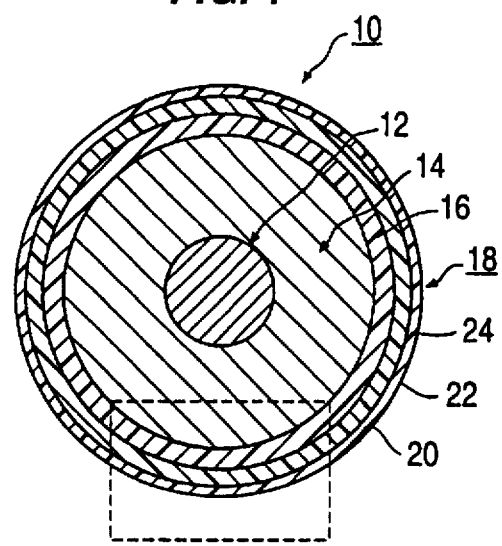
FIG. 1 is a cross-section view of one embodiment of a pressure roller incorporating a release coating of the present invention.

The present invention is a fluoropolymer covered elastomer material which can be made in any number of different geometries for a variety of purposes, such as belts, rollers, sheets, etc. Although not limited to such application, the composite material of the present invention is particularly suitable for use in various printer technologies where resilient rollers, belts, and the like are employed. The material of the present invention has significantly improved properties, including strength, durability, adhesion between the layers, release, chemical inertness, and manufacturability over the conventional technologies.

Throughout the development of the material of the present invention, several different methods of producing a fluoropolymer covered elastomer were developed, all of which provide the properties claimed by the present invention. The general makeup of the fluoropolymer covered elastomer of the present invention incorporates bonding at least one layer of a porous, expanded polytetrafluoroethylene (PTFE) material to a substratum layer (e.g., an elastomer) using an adhesive on one "adhered" side, and then rendering a second "exposed" side non-porous. The exposed side may be rendered non-porous through either filling the exposed pores of the material completely with a fluoropolymer solution, or using heat and pressure to fuse the layers of fluoropolymer together and thereby eliminating the microporous structure. Further, for some applications, it may be desirable to render the exposed side non-porous by performing both densification and solution treatment.

The effect of this procedure is two fold. First, by providing an adhered side of porous material, a very good mechanical bond can be established between the expanded PTFE material and a substratum. This bond is believed to be far superior to previous attempts to chemically bond PTFE to other materials or to chemically etch PTFE material in order to improve chemical bonding. While mechanical bonds are generally much stronger than chemical bonds, mechanical roughening of surfaces is still an extra processing step that may not always be successful at improving adherence. In the present invention, processing is simplified, in that etching or other attempts to modify or roughen the surface of the PTFE need not occur.

Second, the exposed side of non-porous PTFE material provides an excellent release surface for various applications. The expanded PTFE material is very strong, has excellent wear properties, and is highly chemically resistant. Since the PTFE material is the only surface that is exposed during operation, it effectively shields underlying layers from chemical attack and wear. Moreover, the nature of the present invention allows it to be a very thin layer of material, (e.g., on the order of less than 2–4 mils) making it highly compliant. In this manner, the release coating does not seriously diminish resilience and compliance of underlying substrata materials.

The composite release coating of the present invention may be made in the following manner. The expanded PTFE microporous membrane of the present invention can be derived through a number of processes, including by forming an expanded network of polymeric nodes and fibrils in accordance with the teachings of U.S. Pat. No. 3,953,566 issued Apr. 27, 1976, to Gore, incorporated by reference. This material is commercially available in a variety of forms from W. L. Gore & Associates, Inc., of Elkton, Md., under the trademark GORE-TEX®. The expanded PTFE membrane can be made in a number of thicknesses ranging from 0.00025 mils to 0.125 inches (6 µm to 3 mm) with the preferred thickness for the present invention being from 0.00025 to 0.003 inches (6 to 75 µm). The expanded PTFE membrane can be made with porosities ranging from 30% to 98%, with the preferred porosity for the present invention being 50–95%.

Preferably, the expanded PTFE material is made in the following manner. An expanded PTFE sheet may be formed from a mixture of PTFE resin (having a crystallinity of about 95% or above) and a liquid lubricant (e.g., a solvent of naphtha, white oil, mineral spirits, or the like). The mixture is thoroughly blended and then dried and formed into a pellet. The pellet is extruded into a sheet through a ram-type extruder. Subsequently, the lubricant may then be removed through evaporation in an oven. The resulting tube material may then be subjected to uniaxial or biaxial stretching at a temperature of less than 327° C. to impart the desired amount of porosity and other properties to the sheet. Stretching may be performed through one or more steps, at amounts varying from 1:1 or less up to 45:1. The resulting sheet may then be subjected to a sintering temperature above 345° C. (i.e., the melting temperature of PTFE) to amorphously lock the sheet in its expanded orientation. Once expanded and amorphously locked, this sheet may then be cut into any desired shape, such as a tape suitable for spiral or cigarette wrapping around a roller.

The porous, expanded structure obtained comprises polymeric nodes interconnected by fibrils. Typical properties of such a structure comprise a void volume of 20 to 98% (preferably 50 to 95%). As should be evident from the following description, the precise properties and dimension of expanded PTFE structures employed with the present invention are a function of application.

Once the expanded PTFE membrane is obtained, the present invention can be bonded to a substratum material using a number of different adhesives. The choice of adhesive may be application dependent. For bonding to a silicone-type elastomer coating of the kind typically found on printer pressure rollers, suitable adhesives may comprise, without limitation, epoxy, cyanate ester, organic, thermoplastic or thermoset, polyolefins, and silicone adhesives. For adhesion to silicone rubber elastomers, the preferred adhesive is silicone, and most preferably an addition-cure silicone adhesive. The adhesives generally come in flowable fluids, but may also come in the form of sheets or powders. The adhesive may be coated onto the elastomer through a number of process which include, but are not limited to, roller coating, spraying, dip coating, gravure coating, sheet wrapping, and the like.

There are many different types of silicone adhesives all of which have their own specific properties. Most silicones will adhere to silicone rubber, but those with specific adhesion promoters sometimes form a better bond to the silicone rubber than silicones without the promoters. For many applications, the thermal stability of the silicone is of importance. For example, for elastomer roller applications for use in photocopiers, the general temperature required is approximately 200° C. Many silicones are thermally stable to this temperature but silicone adhesives with certain fillers such as iron oxide and the like increase the thermal stability of the silicone adhesive. Silicone adhesives cure in a number of ways including through the use of a catalyst such as platinum or tin, and through the absorption of water and liberation of acetic acid. All of these cure mechanisms have there own unique properties and all of which take different amounts of time to completely cure the silicone adhesive.

The quickest curing mechanism is that found with addition-cure silicone adhesives. These adhesives cure through the addition of a catalyst that generally constitutes a two-part adhesive or an adhesive that must be pre-mixed prior to use. Addition-cure silicone adhesives may be pre-mixed and may be used as a one part adhesive if inhibitors are added to prevent the silicone from curing at working conditions. The silicone adhesive may then be cured by the application of heat, which alters the inhibitors and allow the catalyst to cure the silicone adhesive. Finally, silicone adhesives may have different viscosities, ranging from one centistokes up to 4000K centistokes or more. The preferred viscosity for the present invention depends on the type of composite that is desired, but the preferred range is from 40K to 4000K centistokes.

For use with most printer roller applications of the present invention, the preferred silicone adhesive is an addition-cure silicone adhesive with fillers to increase thermal stability, and adhesion promoters. An example of this type of material is a GE7401 silicone adhesive available from General Electric of Waterford, N.Y. This type of silicone adhesive allows for the most control on curing the silicone. It is important for the present invention to be able to cure the silicone adhesive at a specific time in the making of the composite of the present invention.

The voids of the expanded PTFE on the exposed surface of the present invention may be rendered non-porous through at least two distinct methods, filling or fusing. In both instances, the intent is to produce a continuous surface of fluoropolymer on the surface of the composite.

It is preferred that the porous voids on the exposed side of the expanded PTFE material are densified into a non-porous surface. More specifically the voids of the expanded PTFE are exposed to heat and pressure that fuses the PTFE of the expanded PTFE and eliminates the voids. PTFE will melt flow at temperature ranging from 320° to 550° C. with the preferred range of temperature being 350° to 450° C., and with the most preferred temperature being approximately 400° C. The heat may be applied through a number of process which include, but are not limited to, pressing a roller against a heated roller, passing sheet materials through a heated roller nip, hot air stream, or the like.

The amount of pressure applied may vary depending upon application and the properties desired. For most applications, a pressure of approximately 5 to 500 psi (34 kPA to 3450 kPA) applied for 5 to 600 seconds against the heated surface will provide the required amount of densification.

As is explained in more detail below, the preferred method of fusing the exposed surface of the release coating for roller applications is to press a roller coated with the release coating of the present invention against a heated metal roller. For producing a sheet, the sheet material may be passed through a heated nip. In both cases, the PTFE will compress and flow with pressures ranging from 35 kPa (5 psi) up to 13,800 kPa (2000 psi) or more, with the preferred being in the range of 207 to 3445 kPa (30 to 500 psi). The speed at which the composite is passed through the nip or the speed at which the roller will rotate against the hot roller is approximately between 30.5 cm/min. (1 fpm) to 127 cm/min. (50 fpm) with the preferred being between 12.7 and 50.8 cm/min. (5 to 20 fpm).

Alternatively, the voids in the exposed surface of the expanded PTFE material may be eliminated by filling with a dispersion or solution. A number of different polymer solutions exist that will fill the voids in the surface of an expanded PTFE and provide a continuous, non-porous surface. These include: PTFE, fluorinated ethylene propylene (FEP), perfluoroalkoxy polymer (PFA), ethylene-tetrafluoroethylene (ETFE), amorphous fluoropolymers, and other fluoropolymer dispersions and solutions available from a number of sources, such as E. I. duPont de Nemours and Company, Wilmington Del.

The preferred solutions for use in treating the exposed surface of the release coating of the present invention are those disclosed in PCT Application WO 93/05100 to E.I. DuPont de Nemours and Company. This material comprises perfluoroperhydrophenanthrene with tetrafluoroethylene hexafluoropropylene copolymer. Its beneficial properties include that it is a true solution of fluoropolymer, and that it wets and penetrates into the voids of the ePTFE membrane.

Coating with any of the above identified solutions may be accomplished through any appropriate process, such as, but are not limited to, dipping, painting, roller coating, spraying and the like. Once applied, the solution or dispersion may be dried or cured through a number of process which include, but are not limited to, baking in an oven, passing a hot air stream over the material, passing the material through a heated nip, and the like.

The structure of the present invention may be better understood with reference to the drawings. FIG. 1 shows a cross-section of a pressure roller 10 suitable for use in xerographic printers (e.g., copiers, laser printers, fax machines, and the like). In this instance, the roller 10 comprises a center shaft 12 (typically metal), a solid core 14 (again, typically metal), and an elastomer coating 16 around the core 14. The elastomer coating 16 is selected and sized to provide the necessary amount of compliance to the roller. For example a silicone rubber elastomer coating 16 for use on an approximately 2.54 cm outer diameter roller for use in a laser printer, a typical silicone elastomer coating 16 may comprises about 0.63 to 0.05 cm in thickness. Depending upon the particular application requirements, any suitable underlying layer of material, including either the elastomer coating 16 or the core 14, may serve as a substratum for the release coating of the present invention.

The release coating of the present invention comprises an expanded PTFE membrane skin 18 mounted over the substratum. For most applications of the present invention, this membrane 18 typically will have a thickness of about 0.0127 to 0.250 mm. In the illustrated embodiment, the expanded PTFE membrane 18, comprising an adhered surface 20 and an exposed surface 22, is held to the elastomer coating 16 substratum by a layer of adhesive 24. The adhesive material adheres to the elastomer coating 16 and partially permeates the porous expanded PTFE skin 18 through its adhered surface 20. The exposed surface 22 has been rendered non-porous in one of the manners previously described to effectuate a continuous barrier to protect the substratum from wear or attack.

Figure 2:
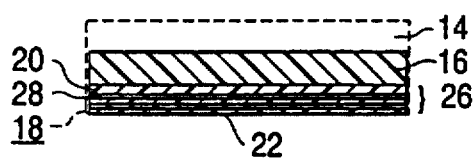
FIG. 2 is a cross-section view of a flattened segment of a pressure roller incorporating another embodiment of a release coating of the present invention prior to densification.
Figure 3:
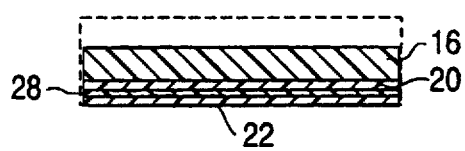
FIG. 3 is a cross-section view of the flattened segment of the pressure roller shown in FIG. 2, with the release coating shown rendered non-porous through densification.

One construction of the release coating of the present invention is shown in greater detail in FIGS. 2 and 3. FIG. 2 illustrates the release coating 26 prior to being rendered non-porous. The release coating includes unfilled porous expanded PTFE 18 on its exposed surface 22 and an adhesive-permeated porous PTFE 28 on its adhered surface 20. FIG. 3 shows the same structure once the exposed surface 22 has been rendered non-porous through densification. The thickness of densified layer 22 is typically 0.006 mm to 0.0508 mm. As can be seen, the exposed surface has been compacted in thickness and has lost its porous structure. By contrast, the adhered surface 20 continues to have a structure with adhesive permeated into its interstices. Thus, the release coating of the present invention provides an excellent mechanical bond to the elastomer coating 16 or other substratum while presenting an impermeable protective layer on its exposed surface 22.

Figure 4:
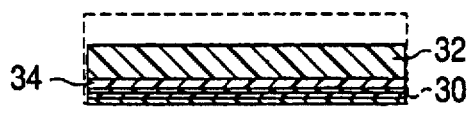
FIG. 4 is a cross-section view of a flattened segment of a pressure roller incorporating another embodiment of a release coating of the present invention prior to final treatment of the exposed surface of the roller.
Figure 5:
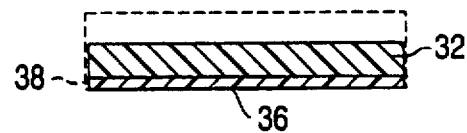
FIG. 5 is a cross-section view of the flattened segment of a pressure roller shown in FIG. 4, with the release coating shown rendered non-porous.

Another embodiment of the present invention is shown in FIGS. 4 and 5. FIG. 4 comprises a porous fluoropolymer skin 30, preferably an expanded PTFE, attached to a substratum 32 by an adhesive layer 34. The porous skin 30 is rendered non-porous by the addition of a fluoropolymer dispersion or solution that will fill its voids and cure or dry to an impermeable layer within the skin 30, as described above.

The material is applied to the skin 30 in the following manner:

The roller is dipped in the solution and then placed in the oven at 150° C. for 30 min. The roller is removed, dipped and dried repeatedly (preferably about 2 to 15 times) until the void space is completely filled. After the voids are completely filled, the roller is placed in the oven at 200° C. for 15 mins.

Once applied in this manner, as is shown in FIG. 5, the skin 30 presents a continuous impermeable barrier on its exposed surface 36. As was true with the previously described embodiment, the adhered surface 38 of this embodiment is permeated with adhesive to form a strong mechanical bond to the substratum 32.

Figure 6:
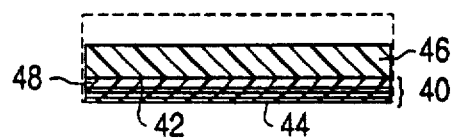
FIG. 6 is a cross-section view of a flattened segment of a pressure roller incorporating still another embodiment of a release coating of the present invention prior to densification.
Figure 7:
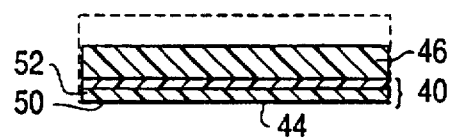
FIG. 7 is a cross-section view of the flattened segment of a pressure roller shown in FIG. 6, with the release coating shown rendered non-porous through densification.

FIGS. 6 and 7 demonstrate yet another release coating of the present invention. FIG. 6 shows an expanded PTFE skin material 40 with adhered surface 42 and exposed surface 44. The adhered surface 42 is bonded to a substratum 46 by an adhesive layer 48. Again, the adhesive layer 48 is permeated into the interstices on one side of the expanded PTFE skin 40. FIG. 7 shows this structure once the exposed side has been treated to render it non-porous. In this instance, a fluoropolymer coating 50 has been applied to the exposed surface and it has partially permeated into the porous structure of the expanded PTFE skin 40. This construction is accomplished by dipping the roller in the solution and then placing it in the oven at 150° C. for 30 min. The roller is removed, dipped and dried until the void space is completely filled (approximately 2 to 15 times). After the voids are completely filled, the roller is placed in the oven at 200° C. for 15 mins. When formed in this manner, the skin 40 is effectively impermeable to chemical infiltration while leaving a layer 52 of unfilled porous PTFE material within the interior of the skin.

Figure 8:
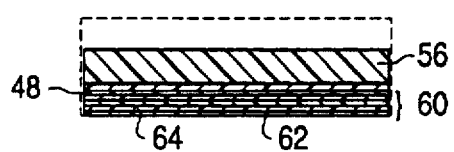
FIG. 8 is a cross-section view of a flattened segment of a pressure roller incorporating yet another embodiment of a release coating of the present invention.

Yet another embodiment of a release coating of the present invention is shown in FIG. 8. In this instance, the material includes a porous fluoropolymer skin 60 adhered to a substratum 56 by an adhesive layer 48. The porous skin 60 is completely impregnated with adhesive from the adhesive layer 48. The surface of the material therefore comprises fluoropolymer 62 from the fluoropolymer skin 60 and adhesive 64 imbibed therein. An adhesive layer 48 is applied to the substratum 56. The porous fluoropolymer 60 is then laid over the adhesive 48. The adhesive 48 penetrates and fills the voids of the porous fluoropolymer layer 60. The adhesive 48 penetrates to the surface of the porous fluoropolymer 60 but does not completely cover the surface. The adhesive is then cured leaving a surface of both the adhesive 64 and fluoropolymer 62.

Figure 9:
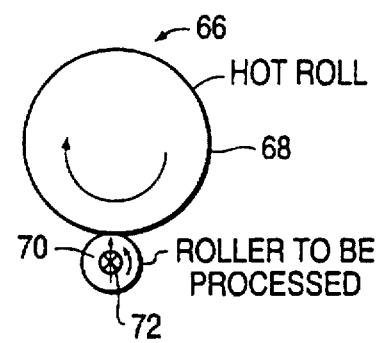
FIG. 9 is a schematic representation of one embodiment of apparatus used to produce the release coating of the present invention.

The preferred method of densification of the present invention comprises employing a hot roller that can be urged toward a roller to be processed, with the two rollers moving against one another, to heat and densify the release coating of the present invention. One example of such an apparatus 66 is shown in FIG. 9. A hot roller 68 is mounted into contact with a roller 70 of the present invention. The roller 70 is mounted on a rotating axis 72 or in some other non-yielding manner to hold it in steady contact with hot roller 68. Operating the hot roller 68 at a temperature of between 250° and 550° C. and an applied pressure of 35 to 13,800 kPa, the rollers 68, 70 are rolled against one another until an even, densified release coating is formed on the exposed surface of the roller 70.

Figure 10:
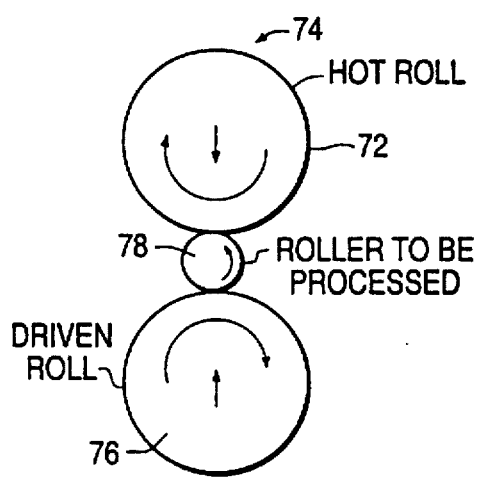
FIG. 10 is a schematic representation of another embodiment of apparatus used to produce the release coating of the present invention.

Another embodiment of apparatus 74 to densify the release coating of the present invention is shown in FIG. 10. In this instance, two rollers are used, a hot roller 72 and a driven roller 76. A roller 78 incorporating the release coating of the present invention is placed between the two rollers 72, 76. By urging the two rollers 72, 76 toward one another, the roller 78 can be densified in accordance with the present invention.

Figure 11:
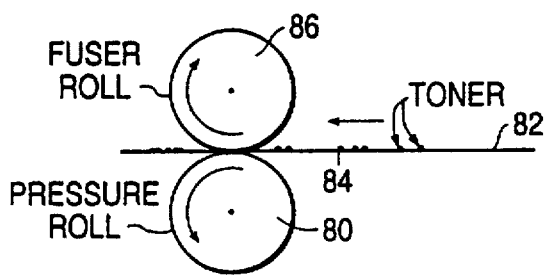
FIG. 11 is a schematic representation of one fuser and pressure roller configuration used in many xerographic printer devices, an example of one application for a pressure roller incorporating the release coating of the present invention.

FIG. 11 illustrates one application for a pressure roller 80 of the present invention. In a conventional electrostatic printer/copier application, a sheet of paper 82 with toner 84 applied thereto is driven past a fuser roller 86 to adhere the image to the sheet 82. In order to maintain the fuser roller 86 in close contact with the sheet of paper 82, a pressure roller 80 is mounted in contact with the fuser roller 86. The pressure roller 80 must be sufficiently conformable to allow the paper to pass between the two rollers 80, 86 while maintaining it against the fuser roller 86. The rollers of the present invention provide the necessary conformance for this application while avoiding the deficiencies previously encountered with existing pressure rollers.

It should be appreciated that the release layer of the present invention has a wide number of applications beyond use in xerographic or electrostatic printers. Among such uses are: as a coating on conveyor belts, such as paper handling belts, used in various industries; the printing industry, contamination sensitive roller process application, including pharmaceutical and food.

Applications that include adhesives, pastes and other tacky substances are also contemplated, including, but not limited to, paints, glues, etc.

Without intending to limit the scope of the present invention, the following examples illustrate how the present invention may be made and used:

EXAMPLE 1

A 2" (5 cm) diameter elastomeric covered metal roller was covered with a fluoropolymer. The elastomer on the metal roller was iron oxide filled silicone rubber which had a durometer measurement of approximately 45 Shore A and was approximately 0.125 inches (6 mm) thick. The roller was roller transfer coated with SLA 7401 silicone adhesive from General Electric Company, Waterford, N.Y. The thickness of the silicone adhesive was approximately 0.5 mils (12.7 micron).

Expanded PTFE was wrapped around the roller approximately 5 times with a slight amount of back tension to prevent wrinkling. The expanded PTFE used was approximately 0.75 mils (18 micron) thick with approximately 80% porosity and with approximately 14,000 psi (96,500 kPa) matrix tensile as measured using the ASTM method D882. The wrapped roller was then placed into an oven at approximately 180° C. for 1 hour to cure the silicone adhesive. The silicone adhesive penetrated into at least the bottom layer of expanded PTFE.

After the roller was removed from the oven, the roller was placed into a lever arm assembly and pressed against a heated metal roller (approximately 2 ft. (61 cm) in diameter) with a temperature of approximately 420° C. and was rotating at approximately 15 fpm (5 meters/min.). The fluoropolymer covered elastomeric roller was pressed against the heated roller with approximately 500 pounds of force, 250 per side, and as the roller rotated against the heated roller, the expanded PTFE fused together to form a void free fluoropolymer covered elastomeric roller. The roller was pressed against the heated roller for approximately 1 minute. The final roller had a translucent, shiny surface which is indicative of void-free fluoropolymer materials. The fluoropolymer layer looked very uniform and the last wrap was fused into the lower layers of the expanded PTFE which eliminated any uneven exposed edge and produced a very consistent diameter roller.

In order to measure the resistance to penetration of solvent, contact angle was measured. Contact angle is a means of determining and comparing the surface energy of materials; the higher the contact angle the lower the surface energy. Generally PTFE has a surface energy of approximately 18 dynes/cm which is much lower than that of silicone rubber, which is generally 25 dynes/cm. The lower the surface energy of a material, the better "release" it will have to materials, or the more "non-stick" the surface will be.

The contact angle of water on the present Example roller was measured to be approximately 115 degrees. This is much higher than the contact angle of water on a silicone rubber, which is approximately 60–75. Therefore the fluoropolymer roller of the present invention provided much better release properties over the silicone rubber roller.

The roller was also tested for durability by placing it against a heated roller and rotating it under load for 300 hours. The heated roller was maintained at approximately 350° F. and the load was maintained at approximately 100 pounds per side. After the 300 hours of revolution, the roller was removed and examined. The fluoropolymer covered elastomeric roller showed no signs of wear and there was no evidence of delamination or of rips or tears in the fluoropolymer layer.

EXAMPLE 2

A 1 inch (25.4 mm) diameter elastomeric covered metal roller was covered with fluoropolymer. The elastomer on the roller was iron oxide filled silicone rubber with a durometer measurement of approximately 70 Shore A. The coating was approximately 0.125 inches (4 mm) thick. The roller was coated with SLA 7401 silicone adhesive from General Electric Company, Waterford, N.Y., by roller transfer coating. The thickness of the silicone adhesive on the roller was approximately 0.5 mils (12.7 micron). The roller was then wrapped with expanded PTFE that was approximately 2 mils thick and had approximately 70% porosity. The membrane was wrapped around the roller with enough back tension to ensure no wrinkling. The silicone adhesive partially filled the voids of the expanded PTFE. The membrane was wrapped around the roller one time and then the roller was placed in the oven at approximately 180° C. for 1 hour. The roller was removed from the oven and allowed to cool to room temperature.

The roller was then dipped in a perfluoroperhydrophenanthrene fluoropolymer solution containing 5% fluoropolymer tetrafluoroethylene-hexafluoropropylene copolymer by weight from DuPont. The solution completely filled the remaining voids of the expanded PTFE. The roller was then place in the oven at approximately 150° C. for approximately 30 minutes in order to drive off the solvent and leave the fluoropolymer from the solution in the voids of the expanded PTFE. The roller was removed from the oven and re-dipped in the fluoropolymer solution and then placed back in the oven 7 times. With each dip and drying, the voids of the membrane became more and more filled with the fluoropolymer in the solution. After the dipping process, the voids of the membrane were completely filled with the fluoropolymer from the solution, and the roller wrapped expanded PTFE layer appeared translucent. The roller was placed in the oven at approximately 220° C. for 1 hour to melt flow the fluoropolymer from the solution.

Flat sheet of silicone rubber were covered in the same manner and examined using a scanning electron microscope at magnification levels up to 5,000 times. Upon examination of the micrographs, no voids were found in the expanded PTFE layer. Accordingly, the surface of the material was considered a "void-free" fluoropolymer layer.

The roller was tested in a bench top durability tester. The test was performed in order to determine how well the fluoropolymer roller would perform in the fuser section of photocopiers. The roller was placed in a housing against a metal roller with a machined 10 mil "step" in it. The metal roller was approximately 3.81 cm in diameter and had a 0.25 mm (10 mil) raise machined in it 180 degrees around the roller approximately 1.5" (3.81 cm) in from either edge of the roller. This machined-in raised section was provided to simulate some of the stresses that would be expected in a photocopier fuser section. The fluoropolymer covered elastomeric roller was pressed against the metal roller with approximately 100 lbs. (45 kg) force on each end. The metal roller was heated with an internal quartz heater and the temperature of the surface of the metal roller was maintained at approximately 220° C. The metal roller was rotated at a rate to produce 40 m/min. (150 fpm) velocity on the fluoropolymer covered elastomeric roller. The fluoropolymer covered elastomeric roller was tested in this manner for 25 hours. The roller was periodically examined and at the end of the test the roller was removed from the housing and inspected. Upon inspection of the roller, no delamination of the fluoropolymer from the silicone rubber was found and the roller had little signs of wear. A conventional silicone rubber roller of the same dimensions as the sample of the present invention was tested under the same conditions and examined afterwards. The roller had excessive cracking in the silicone rubber, and the silicone rubber had a groove worn into it from the edge of the 10 mil section.

EXAMPLE 3

A one inch diameter silicone covered metal roller was cover with a fluoropolymer. The silicone of the roller was an iron oxide filled material approximately 6.3 mm (0.25") thick with a durometer measurement of approximately 25 shore A. The roller was transfer roller coated with SLA 7401 silicone adhesive from General Electric Company, Waterford, N.Y. The thickness of the silicone adhesive coating on the silicone adhesive was approximately 0.0005 inch (13 micron). The roller was then wrapped with approximately 3 layers of expanded PTFE membrane. The membrane was approximately 0.0005 inch (12 micron) thick with a porosity of approximately 80% and a matrix tensile of approximate 20,000 psi (138,000 kPa). The membrane was held under a slight tension during the wrapping to ensure no wrinkling. The roller was then allowed to sit for about 120 minutes until the silicone adhesive penetrated through the 3 layers of the membrane. The capillary force generated by the pores of the expanded PTFE pulls the silicone adhesive into the voids of the expanded PTFE. The silicone adhesive rises through the expanded PTFE, filling the voids, but does not completely cover the surface of the PTFE. The surface of the roller after the silicone adhesive has filled in the voids of the expanded PTFE is a matrix of both silicone and PTFE.

Scanning electron microscope micrographs confirm that the surface of the roller is both PTFE and silicone. Furthermore, XPS/ESCA Test were performed on the surface of the material by Charles Evans & Associates, Redwood City, Calif., and it was determined that the percentage of the roller was 15% silicon and 45% carbon and 21% fluorine (with the remainder being other components). The roller was placed into the oven after the silicone had penetrated into the voids of the expanded PTFE, at a temperature of approximately 180° C. for approximately 1 hour. The roller was then removed from the oven and was rotated against a heated metal roller at approximately 380° C. for approximate 1 minutes at approximately 10 ft/minute.

This roller was then tested in a laser printer under these conditions:
The following results were observed:
The roller was placed in a Lemark Laser Printed Model (43916L) and approximately 10,000 copies were made. The roller was removed and examined. No wear, rips, or delamination was observed.

EXAMPLE 4

A one inch diameter (2.5 cm) silicone covered metal roller was covered with a fluoropolymer. The silicone of the roller was approximately 0.125" (3 mm) thick and the durometer of the iron oxide filled silicone was approximately 25 shore A. The roller was transfer roller coated with SLA7401 silicone adhesive from General Electric Inc. The thickness of the silicone adhesive coating on the silicone was approximately 0.0005" (3 micron) thick. The roller was then wrapped with 1 layer of expanded PTFE membrane. The membrane was approximately 0.0005" (13 micron) thick with a porosity of approximately 80% and a matrix tensile of approximately 20,000psi (138 MPa). The membrane was held under a slight tension during the wrapping to ensure no wrinkling. The roller was then allowed to sit until the silicone adhesive penetrated through the membrane. The capillary force generated by the pores of the expanded PTFE pulls the silicone adhesive into the voids of the expanded PTFE. The surface of the roller after, the silicone adhesive has filled in the voids of the expanded PTFE, is a matrix of both silicone and PTFE. The roller was then place into the oven after the silicone had penetrated into the voids of the expanded PTFE, at a temperature of approximately 180° C. for approximately 30 minutes. The roller was then removed from the oven and coated with a 2% of fluoropolymer solution as previously described as available from DuPont. The thickness of the aforementioned solution coating was approximately 0.001" (13 micron) thick. The roller was then wrapped with 1 layer of expanded PTFE membrane. The membrane was approximately 0.001" thick (13 micron) with a porosity of approximately 80% and a matrix tensile of approximately 20,000 psi (138MPa). The membrane was held under a slight tension during the wrapping to ensure no wrinkling. The roller was then placed into an oven, at a temperature of approximately 160° C. for approximately 30 minutes, to remove solvent in the aforementioned solution. The roller was then removed from the oven and was rotated against a heated metal roller at approximately 380° C. for approximately 10 minutes at approximately 4 FPM (1.3 MPM). The roller was then tested in a laser printer.

EXAMPLE 5

Materials relevant to the present invention were tested for their matrix tensile value, which is a measure of the tensile strength. The fluoropolymer covering of Example 1 was cut along the axis of the roller and the covering was peeled off. The extruded PFA sleeves were obtained in the raw form and were measured as received. The sample materials were cut into 1" by 5" (2.5 cm by 12.7 cm) strips. Samples were cut in both the axial and circumferential direction of the tube. The axial direction of the roller means that the 5" (12.7 cm) dimension of the strip would run along the length of the tube or the axis of the roller. The circumferential direction is perpendicular to the axial direction a measure of the a measure of the tensile strength in the hoop direction of the sleeve.

A sleeve made in accordance with Example 1 was striped off the roller and was tested for tensile strength against two PFA extruded sleeves. One of the PFA sleeves was obtained from Furon Bunnell Plastics Division, Mickleton, N.J. The sleeves from Furon were nominally 0.002" (0.05 mm) thick, 2.0" (5.0 cm) internal diameter PFA sleeves. The other sleeves were obtained from Gunze Inc. of Japan and were the NSE type and were 48.1 mm outer diameter and 390 mm long.

All of the materials were cut in the directions described, weighed and the thicknesses were measured. The matrix tensile was measured using the Instron Model 1122 from Instron Incorporated Boston, Mass. The values are listed below.

| Material | Direction | Thickness Inches | Density g/cc | Matrix Tensile Tensile(psi) | Modulus (psi) |
|---|---|---|---|---|---|
| Gunze | Axial | 0.0019 | 2.11 | 8995 | 6981 |
| Bunnell | Axial | 0.0020 | 2.13 | 6258 | 11094 |
| Example 1 | Axial | 0.0017 | 1.84 | 10170 | 9080 |
| Gunze | Circum | 0.0025 | 1.88 | 7981 | 9870 |
| Bunnell | Circum | 0.0021 | 2.05 | 4652 | 8781 |
| Exampe 1 | Circum | 0.0017 | 1.92 | 18960 | 41910 |

The densified ePTFE layer has a much higher tensile strength than that of the extruded PFA sleeve material. In addition, the results show that the matrix tensile value of the densified ePTFE is much higher in the circumferential direction than in the axial direction. The strength in the circumferential direction is most important because this is the direction in which most of the stress is applied in roller applications. In addition, the modules of the densified ePTFE membrane layer is more than 4 times that of either of the extruded PFA sleeve materials in that direction. It is important to realize however that with the densified ePTFE technology that the strength of the layer can be altered by which expanded PTFE membrane is used to wrap the roller and in which direction.

Samples of densified ePTFE made in accordance with Example 1 were cut and peeled from the elastomeric roller and tested for abrasion resistance against the extruded PFA sleeves from Furon, Bunnell Plastics Division. The extruded PFA sleeve tested was a nominal 0.002" (0.05 mm) thick, approximately 2" (5.0 cm) inner diameter tube. The materials were tested using Universal test ASTM designation D3886-92 on the Universal Wear Tester Model CS 22c-732. The materials were cut and mounted on the tester and then subjected the friction generated from the oscillating metal drum. The abrasive material was the core steel screen and the diaphragm air pressure was set to 3 psi. Eight (8) pounds of weight was added on the head. The thickness of the materials was measured before beginning the test and again when the sample was removed. The following is a table of the wear rate.

| Sample | Initial Thickness inches | Final Thickness inches | Number of cycles | Wear Rate inches/ 10,000 cycles |
| --- | --- | --- | --- | --- |
| Example 1 | 0.0023 | 0.0021 | 20,000 | 0.10 |
| PFA | 0.0018 | 0.00134 | 10,000 | 0.46 |

The contact angle of water was measure on a variety of different materials including densified ePTFE cut and peeled off of the elastomeric core of Examples 1 and 3, the PFA sleeve obtained from Furon as described above, and standard iron oxide filled silicone rubber. The contact angle was measured using the Contact Angle Goniometer Model A100 NRL by Rame-Hart, Inc. Mount Lakes, N.J. The contact angle is related to the surface energy of the material. The higher the contact angle, the lower the surface energy, and consequently, the better release the material would have. For example, PTFE film generally has a surface energy of approximately 18 dynes/cm, which is very low and which gives PTFE films their non stick properties.

| Material | Contact Angle |
| --- | --- |
| Examples 1 & 3 | 111-101 |
| PFA sleeve | 92 |
| Silicone | 68 |

It is evident from these results that the densified ePTFE will have much better release properties than the plain silicone rubber and the PFA sleeve.

The chemical makeup of the surface of two sleeved rollers was determined using XPS/ESCA Material Characterization Test by Charles Evans & Associates. Covers were cut and peeled off of two rollers made in accordance to Examples 2 and 3. The surface of the materials was analyzed to determine the percentage fluoropolymer on the surface. A 2.0×0.8 mm analysis area was used for this testing.

| Sample | F | C | Si | O |
| --- | --- | --- | --- | --- |
| Example 1 | 25.5% | 55% | 5% | 14% |
| Example 3 | 20.8% | 45% | 15% | 20% |

This analysis shows that with the different types of application methods of the densified ePTFE membrane, the percentage fluoropolymer on the surface can be controlled. It is believed that the 5 percent silicon on the surface of the material from Example 1 is due to contamination. It is believed that with this type of covering process, a 100% fluoropolymer surface can be achieved.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A composite release coating that consists essentially of:

an expanded polytetrafluoroethylene (ePTFE) skin having a non-porous exposed surface and a porous adhered surface, the exposed surface being rendered non-porous by the addition of a fluorocarbon solution selected from the group consisting of PTFE, FEP, PFA, ETFE, and amorphous fluoropolymers within the porous structure of the ePTFE skin;

an adhesive layer, the adhesive layer imbibed within the porous ePTFE skin on the adhered surface; and a substratum to which the adhesive layer bonds the ePTFE skin.

2. The composite of claim 1 wherein the substratum comprises a resilient material.

3. The composite of claim 1 wherein the substratum comprises a non-resilient material.

4. The composite of claim 1 wherein the substratum comprises a flexible material.

5. The composite of claim 1 wherein the adhesive layer comprises an elastomeric material.

6. The composite of claim 1 wherein the adhesive layer penetrates through the skin to render the skin non-porous in combination with the fluoropolymer solution.

7. The composite of claim 1 wherein the fluorocarbon solution comprises perfluorperhydrophenanthrene with tetrafluoroethylene hexafluoropropylene copolymer.

8. A composite release coating that consists essentially of:

an expanded polytetrafluoroethylene (ePTFE) skin having a non-porous exposed surface and a porous adhered surface, the exposed surface being rendered non-porous by the addition of a fluorocarbon solution comprising perfluoroperhydrophenanthrene with tetrafluoroethylene hexafluoropropylene copolymer within the porous structure of the ePTFE skin;

an adhesive layer, the adhesive layer imbibed within the porous ePTFE skin on the adhered surface; and a substratum to which the adhesive layer bonds the ePTFE skin.

9. The composite of claim 8 wherein the substratum comprises a resilient material.

10. The composite of claim 8 wherein the substratum comprises a non-resilient material.

11. The composite of claim 8 wherein the substratum comprises a flexible material.

12. The composite of claim 8 wherein the adhesive layer comprises an elastomeric material.

13. The composite of claim 8 wherein the adhesive layer completely penetrates the porous adhered surface.

* * * * *